(12) United States Patent
Sandström et al.

(10) Patent No.: US 7,571,665 B2
(45) Date of Patent: Aug. 11, 2009

(54) HANDLE WITH A POWER-REGULATING DEVICE

(75) Inventors: Bo Sandström, Mullsjö (SE); Urban Jägenstedt, Gränna (SE)

(73) Assignee: Husqvarna AB, Huskvarna (SE)

( * ) Notice: Subject to any disclaimer, the term of this patent is extended or adjusted under 35 U.S.C. 154(b) by 841 days.

(21) Appl. No.: 10/494,130

(22) PCT Filed: Nov. 1, 2002

(86) PCT No.: PCT/SE02/01998

§ 371 (c)(1),
(2), (4) Date: Jun. 9, 2004

(87) PCT Pub. No.: WO03/037572

PCT Pub. Date: May 8, 2003

(65) Prior Publication Data

US 2004/0250645 A1    Dec. 16, 2004

(51) Int. Cl.
*F16C 1/10* (2006.01)
(52) U.S. Cl. .................................... 74/502.2
(58) Field of Classification Search .............. 74/501.6, 74/502.2, 500.5, 516–519, 469, 481, 482, 74/488; 446/31; 254/243, 248, 256, 259; 56/10.1, 11.3
See application file for complete search history.

(56) References Cited

U.S. PATENT DOCUMENTS

| 3,161,988 | A | * | 12/1964 | Junker | 446/31 |
| 5,299,466 | A | * | 4/1994 | Heilbron et al. | 74/502.2 |
| 5,850,761 | A | * | 12/1998 | Sugimoto | 74/489 |
| 5,868,377 | A | | 2/1999 | Ohsawa et al. | |
| 6,055,797 | A | | 5/2000 | Nagashima | |
| 6,182,524 | B1 | | 2/2001 | Nagashima | |
| 6,551,153 | B1 | * | 4/2003 | Hattori | 440/87 |
| 6,810,764 | B2 | * | 11/2004 | Chen | 74/502.2 |
| 6,880,425 | B2 | * | 4/2005 | Shahana | 74/502.2 |
| 2003/0150287 | A1 | * | 8/2003 | Lev-Ran | 74/488 |

* cited by examiner

*Primary Examiner*—Vicky A Johnson
(74) *Attorney, Agent, or Firm*—Pearne & Gordon LLP (57) ABSTRACT

Device in a handle (10) comprising a throttle (13) for controlling the power of an engine powered portable tool via a line or wire (w). The throttle (13) is arranged to turn around a first axle (A). The turning movement in the throttle (13) is transformed into an axial movement in the line or wire (w) by a lever (30) that is turning around a second axle (31) angled in relation to the first axle (A).

17 Claims, 6 Drawing Sheets

HANDLE WITH A POWER-REGULATING DEVICE

This application claims the benefit of International Application Number PCT/SE02/01988,which was published in English on May 8, 2003.

The invention relates to a device in a handle comprising a throttle activated by the operator's thumb and used for controlling the power of an engine powered portable tool via a line or wire.

Combustion-engine powered tool are frequently used for different types of work in forests and gardens. There are several different types of tool optimised for different types of work, for example clearing saws, trimmers and hedge trimmers.

The tools are available in different sizes. The smallest ones are hand held tools while the bigger and heavier ones are carried in a harness placed on the back of the operator in order to reduce the loads on the operator. The bigger and heavier tools that are carried in a harness are normally designed so that the engine and related components are placed in one end of a shaft while the trimmer head, cutter blade or saw chain is placed in the other end of the shaft. The tool is attached to the harness close the centre of the shaft so that the tool is balanced and easy for the operator to manoeuvre. Some of the tools are provided with a movable handlebar placed somewhere along and about perpendicular to the shaft in order to increase the manoeuvrability of the tool.

The handlebar is provided with all the necessary functions for controlling and manoeuvring the tool, for example a throttle and a stop button in case of an accident or emergency situation. For the safety and ergonomic reasons is it important that the functions are placed so that they are easy for the operator to reach and use.

Another important aspect for all components in the tool is the weight of the components. Since the operator is working long shifts with the tool will the tool weight be of great importance for the amount of loads that the operator is exposed to during use. The total weight of the tool as well as the weight of the different components are important since the weight of the components will affect the balance of the tool and therefore also the manoeuvrability.

The handles for mounting on handlebar that are available on the market today have several drawbacks. The known handles where the operator controls the throttle by the thumb are designed so that the throttle is placed on the top of the handle and is turnable around the handle. The operator increases the power by pressing the throttle by the thumb so that the throttle turns around an axle that runs through the longitudinal centre of the handle. The throttle is secured to an axle that runs inside the handle from the top of the handle and down to a cavity in the bottom section of the handle where the handle is secured to the handlebar. The end of the axle is provided with a short arm, perpendicular to the longitudinal direction of the axle, and related parts so that the rotation of the axle is changed into an axial movement in the line or wire that controls the power of the engine.

This solution works but the throttle is not mowing easily which will be tiring for the operator. Another drawback is that the handle is heavy and unwieldy since it includes several different components to transform the rotation in the axle into an axial movement. This solution makes it also complicated to secure the handle to the handlebar in an easy way so that the connection is strong and reliable. The fact that it is complicated to secure the handle to the handlebar and that the handle includes several different components makes the handle expensive to manufacture.

The handles available on the market today have several drawbacks both in the manoeuvrability for the operator and the construction of the handle regarding the weight and stability.

The claimed handle will either solve or reduce the problems described above.

The new handle is provided with a newly designed throttle, which makes it possible to modify and improve the handle considerably. The weight of the new handle is reduced since the securing of the handle to the handlebar is simplified. This also makes the handle lighter at the same time as the securing is more stable. The stability is increased as a result of the new handles that is thread on the handlebar, which means that the operator will be holding the handlebar instead of a device attached to the handlebar. The design of the new handle is also simplified and the ergonomic features improved.

The throttle is shaped so that the operator controls the power by using the thumb to press the throttle so that it turns around the handle. The throttle is attached to the top of the handle close to the longitudinal centre of the handle and turns around the point where it is attached to the handle. The throttle can also be placed somewhere else at the handle if that for some reason is desired. The turning movement of the throttle is not usable for controlling the power of the engine directly so the turning movement must be transformed into an axial movement in the line or wire that controls the power. This transformation is done with an ingenious design of the throttle and the related parts, which makes it possible to do the transformation in the top section of the handle, close to where the throttle is attached to the handle. This solution makes it possible to design the handle with a hollow bottom end so that the handle may be thread on the handlebar. The line or wire is lead inside or outside the tub that constitute the handlebar to the engine.

The transformation from a turning movement to an axial movement in the line or wire that controls the power of the engine is done by the throttle that is acting on a lever that is turning around a second axle in one end of the lever. In the other end is the line or wire attached so that when the operator presses the throttle is the lever activated and rotated around the second axle which means that the line or wire is put into motion.

Both the throttle and the lever are provided with a protruding part. The protruding parts are placed so that they extend in radial direction from the axles that the throttle and the lever are rotating around. The throttle and the lever are placed in the top section of the handle with the protruding part on the throttle in contact with the protruding part on the lever. The axles that the throttle and the lever are turning around are preferably placed about perpendicular to each other but it will work as long as the axles not are parallel. When the operator presses the throttle so that it turns will the protruding part on the throttle press on the protruding part on the lever so that a force is generated which will rotate the lever. This force will turn the lever around the second axle so that the movements in the lever are transformed to the line or wire that control the power of the engine.

This solution reduces the resistance between the throttle and the lever to a minimum, which will make it easier for the operator to adjust the power of the engine.

The throttle described above and the related parts makes it also possible to design a handle that is less complicated and lighter. Since the transformation is done in the top of the handle is it possible to have a hollow bottom of the handle, so that the handle could be tread on the handlebar. This solution increases the stability and reduces the weight of the handle.

Two embodiments of the claimed invention are illustrated in the drawings.

Figure 1:
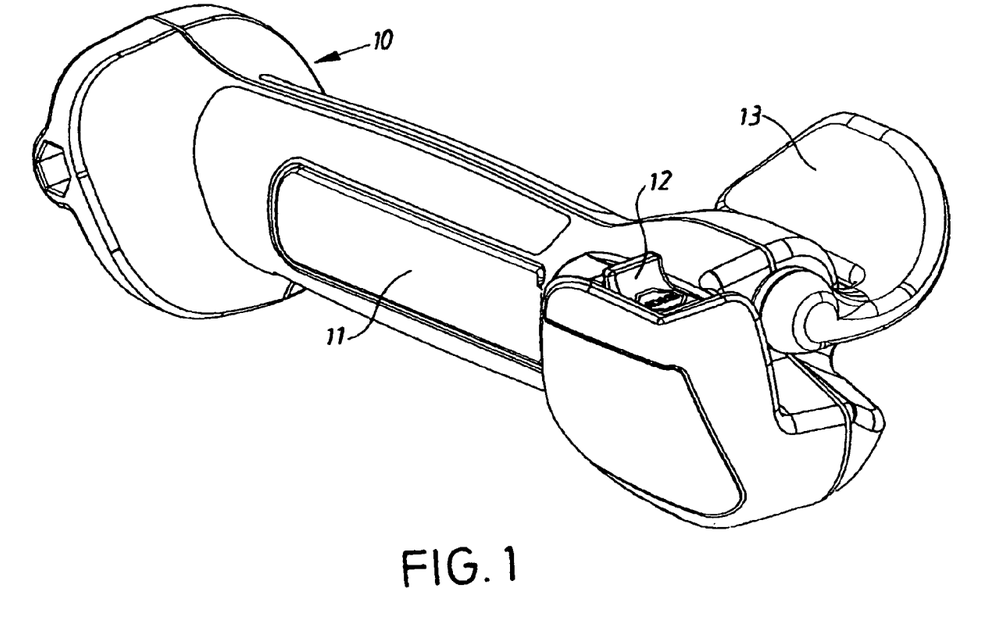
FIG. 1. Illustrates a perspective view of the handle and the throttle.

In FIG. 1 is a handle 10 for a portable engine powered tool, like for example a trimmer or a clearing saw, illustrated. The handle 10 comprises a safety latch 11 that is pressed into the handle when the operator holds the hand around the handle 10 in the correct position. If the operator, for some reason, releases the hand from the handle 10 so that the safety latch 11 returns to its normal position is the power of the engine reduced to idling level and the tool stopped from rotating. In the top of the handle 10 is also a stop button 12 and a throttle 13 placed in the top of the handle for controlling the power of the engine. The throttle 13 is placed and shaped so that the operator presses the throttle 13 by the thumb. The handle 10 that is illustrated in the figure is designed to match the right hand of the operator but the handle 10 could also be adapted to match the left hand of the operator.

Figure 2:
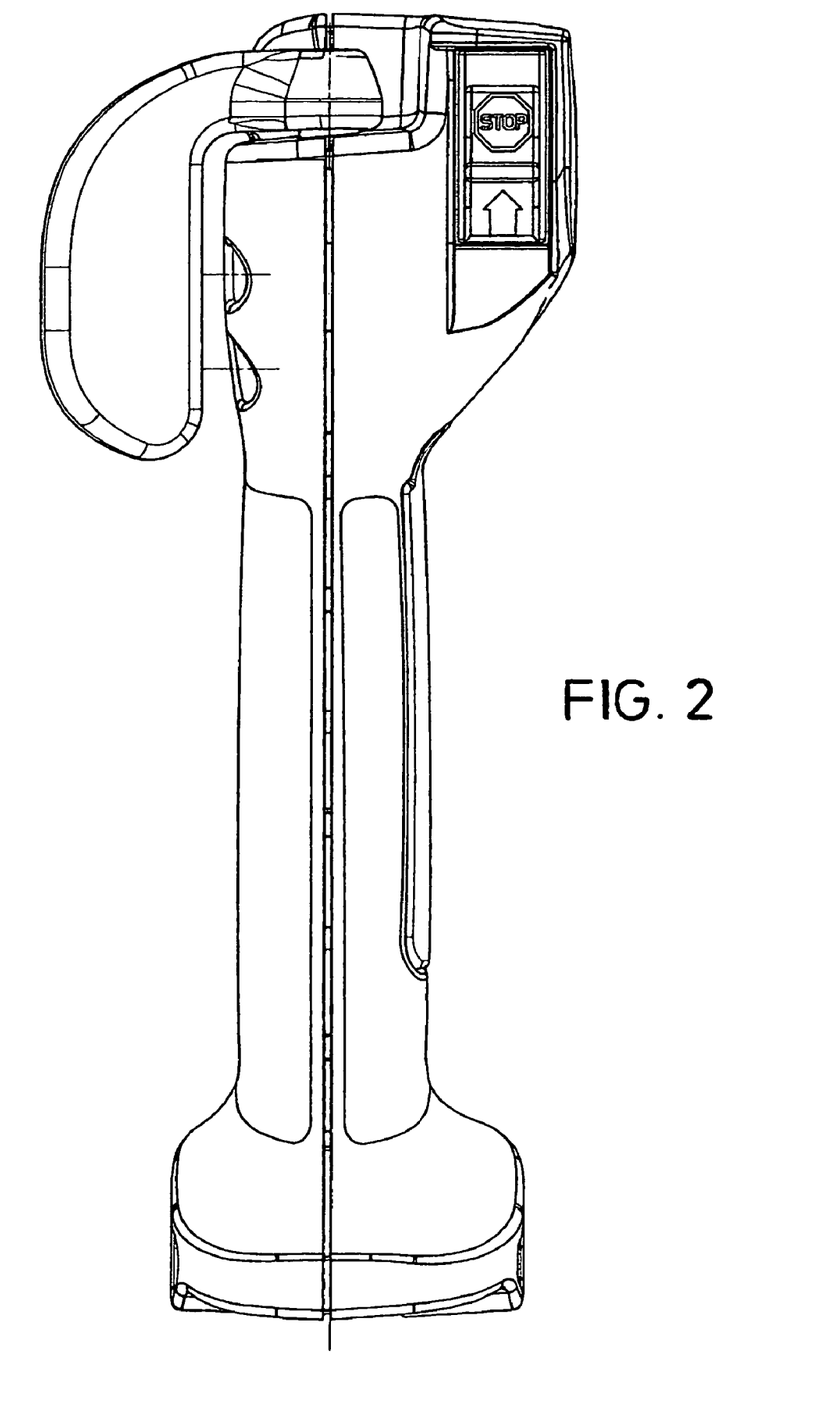
FIG. 2. Illustrates a perspective view of the throttle.

In FIG. 2 is the side of the handle 10 that is turned towards the operator when the handle 10 is in the right position during use illustrated. The throttle 13 is attached to the top of the handle 10 close to the longitudinal central axle of the handle 10 so that the throttle can turn around the top of the handle 10. The operators thumb is in contact with a curved plate 14 on the throttle that is shaped to match the thumb.

The throttle 13 claimed in this application has a new design which makes it possible to transform the radial movement in the throttle 13 to an axial movement in the line or wire that controls the power of the engine in the top section of the handle 10 where the throttle 13 is secured to the handle 10.

Figure 3:
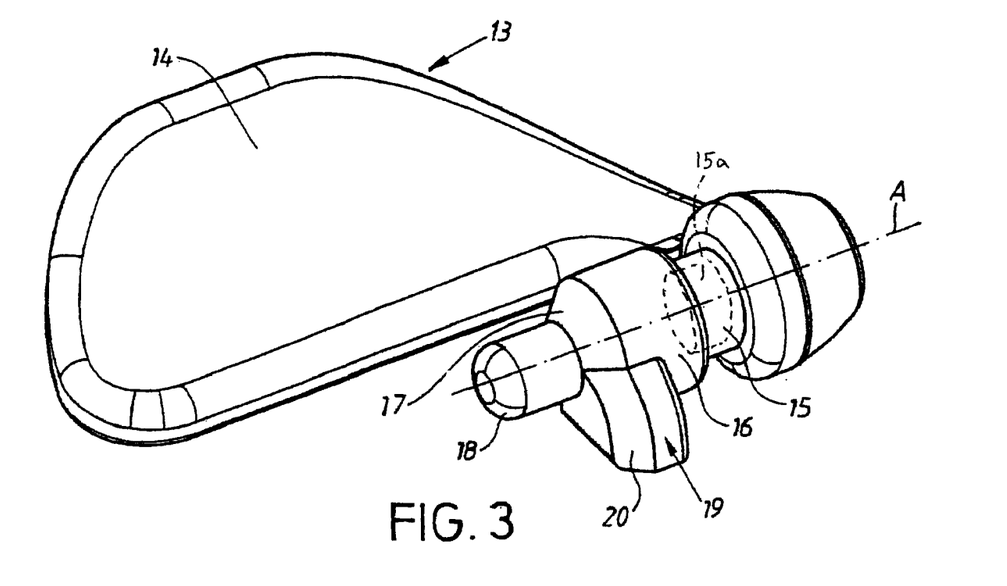
FIG. 3. Illustrates a perspective view of the lever.

In FIG. 3 is a perspective view of the throttle illustrated without the surrounding components and handle casing. The operators thumb is placed on a curved plate 14 on the throttle 13. Above the curved plate 14 is the throttle 13 turned so that it enters into the handle casing on the top side of the handle 10 close to the longitudinal axle through the centre of the handle 10. The throttle 13 enters the casing of the handle 10 through a bearing 15a that is acting on a cylindrical part 15 of the throttle 13 with smaller diameter than the adjacent parts of the throttle 13. The throttle 13 is kept in the right position in the handle 10 both in axial and radial direction due to the bearing 15a around an axle A. Axle A is in the illustrated embodiment of the handle 10 parallel to the longitudinal axial direction of the handle 10.

Below the cylindrical part 15 of the throttle 13 seen from the entrance in the handle casing is a cylindrical section 16 with circular cross section and bigger diameter than the cylindrical part 15 that are fixed in the bearing 15a. The section 16 has a constant cross section and is followed by a narrowing section 17. The narrowing section 17 has an angle about 45 degrees in relation to the longitudinal axle A and narrows until the diameter is smaller than the diameter of the cylindrical part 15. The diameter is then constant for a distance before it is rounded to create an ending 18 of the throttle 13.

The cylindrical section 16 and the narrowing section 17 are along a part of the circumference provided with a protruding part 19. The protruding part 19 has a surface 20 that is angled about 45 degrees in relation the axle A and starts from the narrowing section 17. The surface 20 that is curved in two dimensions and is pointing outwardly from the axle A so that the radius from the axle A to the surface 20 increases when the operator presses the throttle 13 so that it turns around the axle A.

Figure 4:
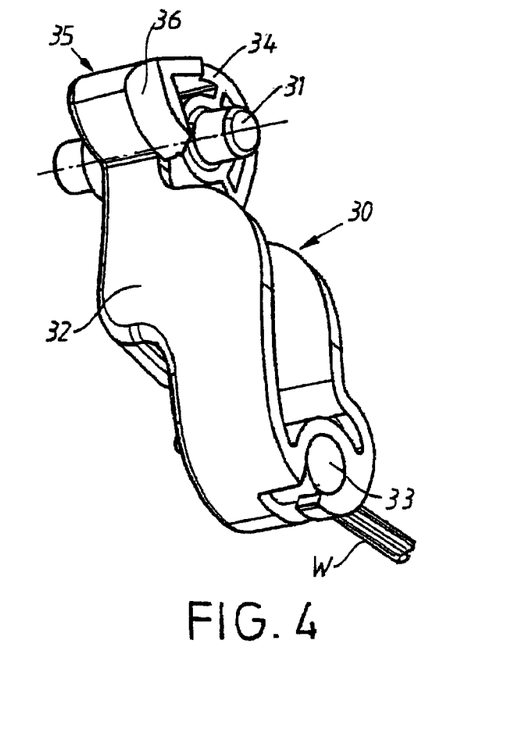
FIG. 4. Illustrates the throttle and the lever placed together.

The throttle 13 aligns a lever 30 that is illustrated in FIG. 4. The lever 30 is turning around an axle 31 that is secured in the top section of the handle 10. Perpendicular to the axle 31 is an arm 32 with an attaching device 33 placed in the end of the arm 32 to which a line or wire (w) that controls the power of the engine is fastened. The axle 31 is surrounded by a second cylindrical section 34 placed so that the longitudinal axle of the cylindrical section 34 coincide with the axle 31. The arm 32 starts from the circumference of the cylindrical section 34 that also is provide with a protruding section 35.

The protruding section 35 has one surface 36 that is angled about 45 degrees in relation to the axle 31 and starts from the cylindrical section 34. The surface 36 is, in the same way as the surface 20 on the throttle 13, curved in two dimensions. The surface 36 starts from the cylindrical section 34 and is pointing outwardly so that the radius from the axle 31 to the surface 36 is increasing when the distance from the starting point at the cylindrical section 34 is increasing.

Figure 5:
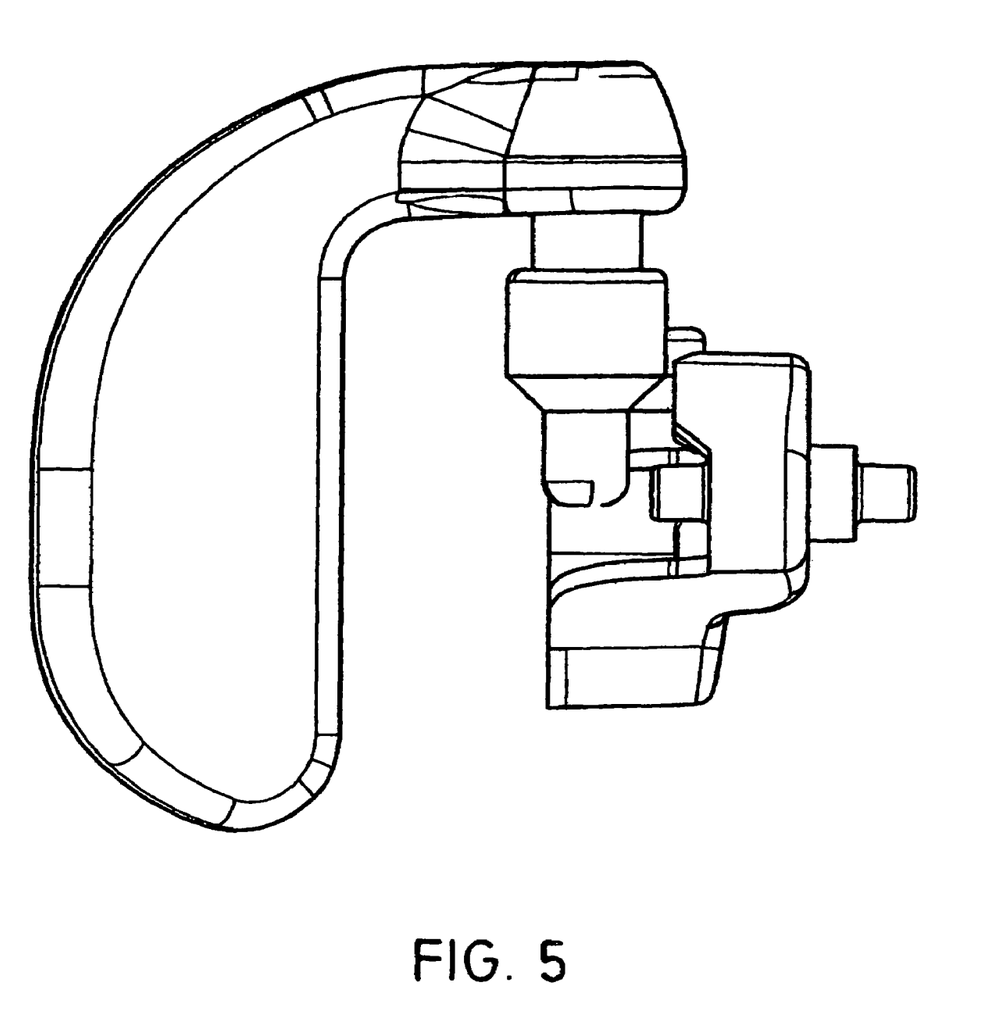
FIG. 5. Illustrates the two parts from FIG. 5 placed in there right position if the top of the handle.
Figure 6:
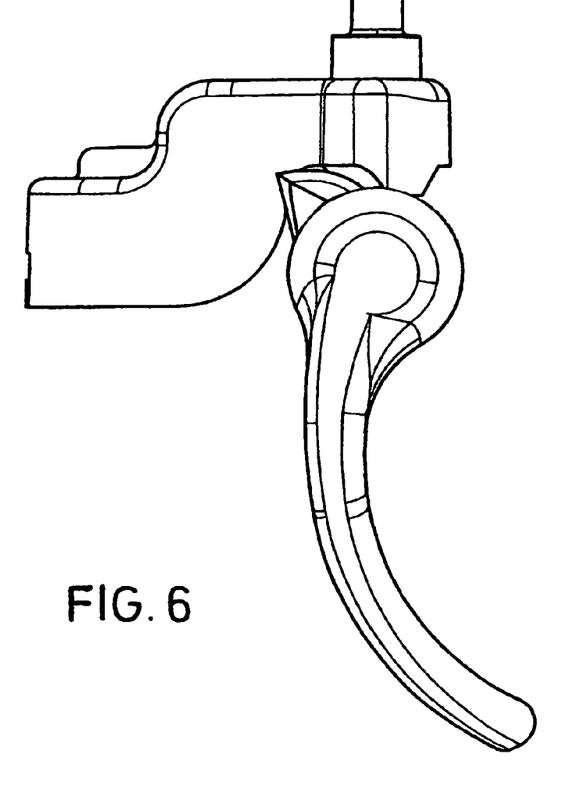
FIGS. 6 and 7. Illustrates another two views of the parts in FIG. 5.
Figure 7:
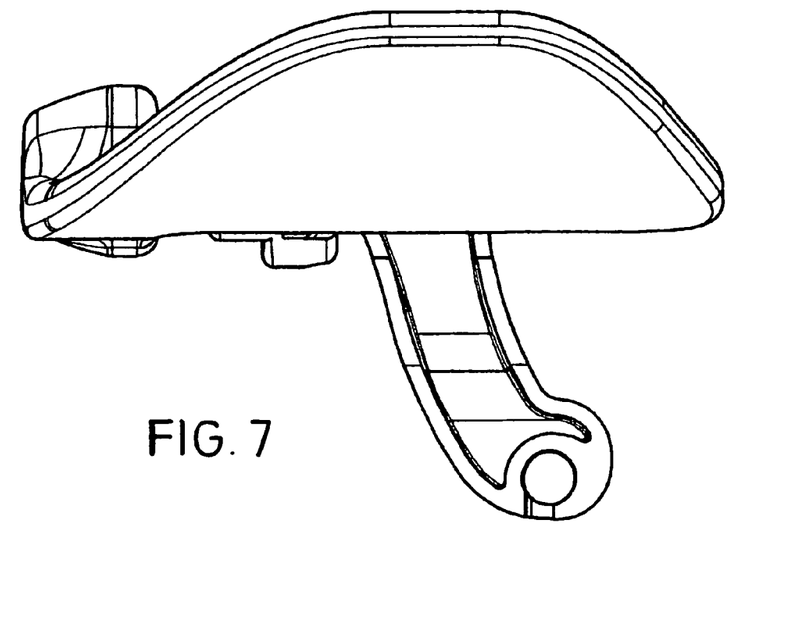

Three different views of the throttles 13 and the levers 30 positions in relation to each other are illustrated in FIG. 5, 6 and 7. The throttle 13 and the lever 30 are placed so that the longitudinal axle A in the throttle 13 is almost perpendicular to the axle 31 that the lever 30 is turning around. The lever 30 is placed so that the surface 36 on the protruding section 35 on the lever 30 is in contact with the surface 20 on the protruding part 19 on the throttle 13.

When the operator presses the throttle 13 so that it turns around the longitudinal axle A is a force generated and acting on the surface 36 on the lever 30 because of the surfaces 20 and 36 on the protruding part 19 and the protruding section 35 that is shaped so that the distance from the axle A that the throttle is turning around and the axle 31 that the lever 30 is turning around to the surfaces are increased when the operator presses the throttle 13 in order to increase the power of the engine. The force makes the lever 30 turn around the axle 31 and the rotating movement in the throttle 13 is thereby transformed into an axial movement in the line or wire that controls the power of the engine and is secured in the lever 30 in the attaching device 33.

The two surfaces 20 and 36 are curved in two dimensions to roll against each other instead of slide. This reduces the frictional resistance, which will reduce the force required to turn the throttle 13 and the wear on the throttle 13 and the lever 30. The shape an the angle of the surfaces 20 and 36 are selected according to a mathematical formula to match each other, which is necessary to make the transformation work as intended. The solution works even though the angle between the axle A and the axle 31 not necessarily is 90 degrees. If the angle is different must the curvatures and the angles to the surfaces on the throttle and the lever be optimised for that particular angle to make the transformation work properly.

Figure 8:
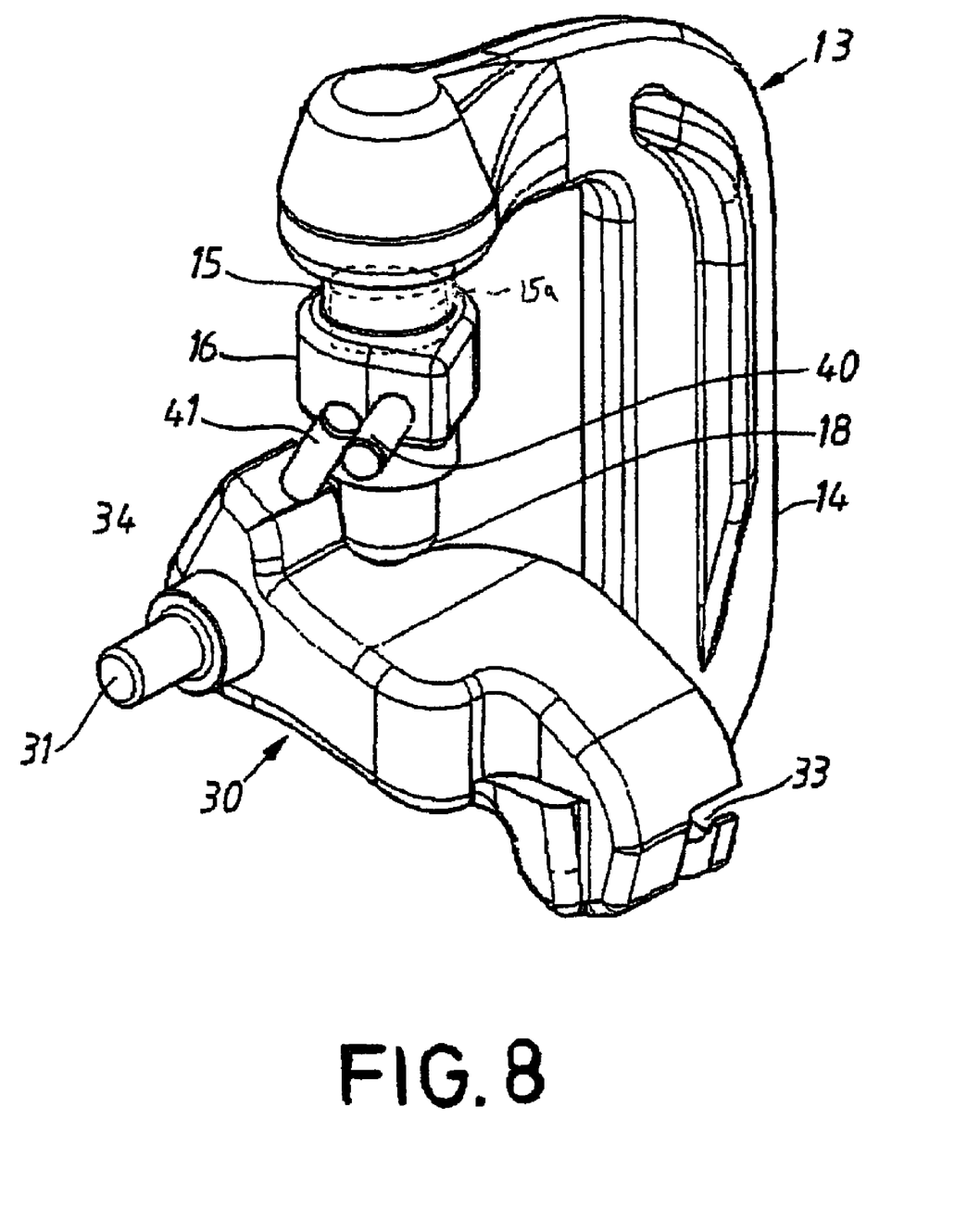
FIG. 8. Illustrates a perspective view of the second embodiment of the throttle and the lever.

The second embodiment of the claimed invention is illustrated in FIG. 8. The difference between this and the already described embodiment is the design of the protruding parts on the throttle 13 and the lever 30.

The cylindrical section 16 on throttle 13 in FIG. 8 is provided with a first pin 40 that is extending outwards from the axle A that the throttle is turning around. The pin 40 is manufactured by a plastic or metallic material. The throttle 13 and the lever 30 is placed in the top section of the handle 10 in a position relative each other where the first pin 40 is in contact with a second pin 41 that is extending outwards from the cylindrical section 34 that surrounds the axle 31 on the lever 30. When the operator presses the throttle 13 and the throttle 13 turns will the first pin 40 press the second pin 41 so that the lever turns around the axle 31. The movement in the lever 30 does, like in the first embodiment, transform the movement in the throttle 13 to an axial movement in the line or wire w that are connected with the engine.

The angle between the axle A that the throttle 13 turns around is perpendicular to the axle 31 that the lever rotates around but the invention will work even with other angles between the axles as long as they not are parallel.

The first and the second pin 40 and 41 will slide against each other during when the position of the throttle 13 is changed and it is therefor important that the pins are made of a material that is resistant to wear. In order to keep the friction resistance low is the surfaces of the pins preferably made as smooth as possible.

The lower part of the handle 10 is hollow in both embodiments of the inventions to make it possible to tread the handle on the handlebar. This is one of the advantages with this handle 10 since the solution is very stable and light because of the simple securing of the handle to the handlebar. The line or wire is lead to the engine either inside or outside the handlebar.

The invention claimed is:

1. Device in a handle (10) comprising a throttle (13) activated by the operators thumb and used for controlling the power of an engine powered portable tool via a line or wire (w), said throttle (13) is arranged to turn around a first axle (A) substantially parallel to the longitudinal axle of the handle (10), said first axle (A) in the throttle (13), characterized in that said turning movement in the throttle (13) is transformed into an axial movement in the line or wire (w) by a first protruding part (19; 40) on the throttle (13) acting on a second protruding part (35; 41) on a lever (30) so that the lever (30) is turned around a second axle (31) angled in relation to the first axle (A) when the operator presses the throttle (13), the second axle (31) is surrounded by a cylindrical section (34) provided with a second protruding section (35) with one surface (38) that is curved in two dimensions, characterized in that the first axle (A) and the second axle (31) are arranged in the handle (10) so that the surface (20) on the protruding part (19) is in contact with the curved surface (38) on the protruding section (35).

2. Device according to claim 1, characterized in that the first axle (A) and the second axle (31) are placed substantially perpendicular to each other.

3. Device according to claim 1, characterized in that the throttle (13) has a cylindrical part (15) secured to the handle (10) in axial and radial direction by a bearing so that the throttle (13) can turn.

4. Device according to claim 1, characterized in that the throttle (13) has a narrowing section (17) where a first protruding part (19) is attached and provided with a surface (20) curved in two dimensions.

5. Device according to claim 4, characterized in that the surface (20) is placed so that the radius between the first axle (A) and the surface (20) increases in the direction outwards from the section (17).

6. Device according to claim 1, characterized in that the radius between the axle (A) and the point where the curved surface (20) on the throttle (13) is in contact with the curved surface (38) on the lever (30) increases when the operator presses the throttle (13) by the thumb so that the lever (30) is turned around the second axle (31).

7. Device according to claim 1, characterized in that the curved surfaces (20, 38) are shaped so that they will roll against each other when the turning movement is the throttle (13) is transformed into axial movement in the line or wire (w) in order to minimize the wear and friction between the throttle (13) and lever (30).

8. Device in a handle (10) comprising a throttle (13) activated by the operators thumb and used for controlling the power of an engine powered portable tool via a line or wire (w), said throttle (13) is arranged to turn around a first axle (A) substantially parallel to the longitudinal axle of the handle (10), said first axle (A) in the throttle (13), characterized in that said turning movement in the throttle (13) is transformed into an axial movement in the line or wire (w) by a first protruding part (19; 40) on the throttle (13) acting on a second protruding part (35; 41) on a lever (30) so that the lever (30) is turned around a second axle (31) angled in relation to the first axle (A) when the operator presses the throttle (13), characterized in that a first pin (40) is extending outwards from the throttle, said throttle placed inside the handle (10).

9. Device according to claim 8, characterized in that the lever (30) has a cylindrical section (34) that surrounds the axle (31).

10. Device according to claim 9, characterized in that a second pin (41) extends outwards from the cylindrical section (34) on the lever (30).

11. Device according to claim 10, characterized in that the throttle (13) and the lever (30)is placed so that the first pin (40) is in contact with the second pin (41).

12. Device according to claim 11, characterized in that the turning movement in the throttle (13) is transformed via the first and the second pin (40 and 41) so that the lever is rotated around the axle (32) and the line or wire (w) activated.

13. Device according to claim 12, characterized in that the first and the second pin (40 and 41) is made of a material that is resistant to wear and has a surface to minimize the friction resistance between the first and the second pin during movement.

14. Device according to claim 8, characterized in that the first axle (A) and the second axle (31) are placed substantially perpendicular to each other.

15. Device according to claim 8, characterized in that the throttle (13) has a cylindrical part (15) secured to the handle (10) in axial and radial direction by a bearing so that the throttle (13) can turn.

16. Device according to claim 8, characterized in that the throttle (13) has a narrowing section (17) where a first protruding part (19) is attached and provided with a surface (20) curved in two dimensions.

17. Device according to claim 16, characterized in that the surface (20) is placed so that the radius between the first axle (A) and the surface (20) increases in the direction outwards from the section (17).

* * * * *

UNITED STATES PATENT AND TRADEMARK OFFICE
CERTIFICATE OF CORRECTION

PATENT NO. : 7,571,665 B2  Page 1 of 1
APPLICATION NO. : 10/494130
DATED : August 11, 2009
INVENTOR(S) : Sandström et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1463 days.

Signed and Sealed this

Seventh Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,571,665 B2 | Page 1 of 1 |
| APPLICATION NO. | : 10/494130 | |
| DATED | : August 11, 2009 | |
| INVENTOR(S) | : Bo Sandstrom et al. | |

It is certified that error appears in the above-identified patent and that said Letters Patent is hereby corrected as shown below:

Title Page, item (30), Please insert section reading --Foreign Application Priority Data--

Title Page, item (30) Foreign Application Priority Data insert
--Nov. 2, 2001           (SE).........................................................0103667-2--

Signed and Sealed this
Twenty-fifth Day of January, 2011

David J. Kappos
*Director of the United States Patent and Trademark Office*